(12) United States Patent  (10) Patent No.: US 7,432,878 B1
Nayar et al.  (45) Date of Patent: Oct. 7, 2008

(54) METHODS AND SYSTEMS FOR DISPLAYING THREE-DIMENSIONAL IMAGES

(75) Inventors: Shree K Nayar, New York, NY (US); Assaf Zomet, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 11/578,656

(22) PCT Filed: Apr. 19, 2005

(86) PCT No.: PCT/US2005/013192
§ 371 (c)(1), (2), (4) Date: Apr. 28, 2008

(87) PCT Pub. No.: WO2005/104545
PCT Pub. Date: Nov. 3, 2005

Related U.S. Application Data

(60) Provisional application No. 60/563,486, filed on Apr. 19, 2004.

(51) Int. Cl.
G02B 26/00 (2006.01)
(52) U.S. Cl. ........................................................ 345/6
(58) Field of Classification Search .................. None
See application file for complete search history.

(56) References Cited

U.S. PATENT DOCUMENTS

| | | | |
|---|---|---|---|
| 4,878,735 A | 11/1989 | Villums | |
| 4,890,902 A | 1/1990 | Doane et al. | |
| 5,032,003 A | 7/1991 | Antes | |
| 5,347,644 A | 9/1994 | Sedlmayr | |
| 5,392,140 A * | 2/1995 | Ezra et al. | 349/15 |
| 5,410,345 A | 4/1995 | Eichenlaub | |
| 5,465,175 A | 11/1995 | Woodgate et al. | |
| 5,764,317 A | 6/1998 | Sadovnik | |

(Continued)

FOREIGN PATENT DOCUMENTS

JP    03-036583    2/1991

(Continued)

OTHER PUBLICATIONS

Benton, Slowe, Kropp, and Smith, "Micropolarizer-based multiple-viewer autostereoscopic display," Stereoscopic Displays and Virtual Reality Systems VI, SPIE Proc., vol. 3639, pp. 76-83, May 1999.

(Continued)

*Primary Examiner*—Ulka Chauhan
*Assistant Examiner*—Peter-Anthony Pappas
(74) *Attorney, Agent, or Firm*—Byrne Poh LLP

(57) ABSTRACT

Methods and systems are provided for displaying 3D images using a display system having multiple physical layers. The physical layers of the display system are controlled (or manufactured) such that the display system produces a desired 4D light field corresponding to a real or synthetic 3D object or scene to be viewed by an observer. This may be accomplished, for example, by determining the transmittance values of one or more points in each physical layer that are required such that the desired 4D light field is produced by the display system. Various alternative embodiments are also disclosed.

30 Claims, 3 Drawing Sheets

U.S. PATENT DOCUMENTS

| | | | |
|---|---|---|---|
| 5,831,765 | A | 11/1998 | Nakayama |
| 5,959,704 | A | 9/1999 | Suzuki et al. |
| 6,023,277 | A * | 2/2000 | Osaka et al. ............... 345/419 |
| 6,040,807 | A | 3/2000 | Hamagishi et al. |
| 6,204,967 | B1 * | 3/2001 | Morishima et al. .......... 359/462 |
| 6,229,561 | B1 | 5/2001 | Son et al. |
| 6,246,451 | B1 * | 6/2001 | Matsumura et al. ........... 349/15 |
| 6,262,694 | B1 | 7/2001 | Ishimoto et al. |
| 6,466,185 | B2 | 10/2002 | Sullivan et al. |
| 6,721,023 | B1 | 4/2004 | Weiss et al. |
| 6,801,354 | B1 | 10/2004 | Payne et al. |
| 7,106,274 | B2 * | 9/2006 | Nishihara et al. .............. 345/6 |
| 2002/0008674 | A1 | 1/2002 | Son et al. |
| 2002/0067356 | A1 * | 6/2002 | Sudo et al. ................. 345/427 |
| 2003/0052836 | A1 | 3/2003 | Matsumoto |
| 2003/0107805 | A1 | 6/2003 | Street |

FOREIGN PATENT DOCUMENTS

| | | |
|---|---|---|
| JP | 08062562 | 3/1996 |
| JP | 2000-305485 | 11/2000 |
| JP | 2001-133918 | 5/2001 |
| JP | 2003035885 | 2/2003 |
| JP | 2004-077937 | 3/2004 |
| JP | 2004144874 | 5/2004 |

OTHER PUBLICATIONS

Downing, E., Hesselink, L., Ralston, J., and MacFarlane, R., "A Three-Color, Solid-State, Three-Dimensional Display," Science, 273:1185-1189, Aug. 1996.

Eichenlaub, J.B., "Mulitperspective Look-Around Autostereoscopic Projection Display Using and ICFLD," Stereoscopic Displays and Virtual Reality Systems VI, SPIE Proc., vol. 3639, pp. 110-121, May 1999.

Lipton, L., and Halnon, J., "Universal Electronic Stereoscopic Display," Stereoscopic Displays and Virtual Reality Systems III, SPIE Proc., vol. 2653, pp. 219-223, Apr. 1996.

Patti et al., "Superresolution Video Reconstruction with Arbitrary Sampling Lattices and Nonzero Aperature Time," IEEE Transactions on Image Processing, 6(8):1064-1076, Aug. 1997.

Perlin, K., Paxia, S., and Kollin, J.S. "An Autostereoscopic Display," Proceedings of the 27th Annual Conference on Computer Graphics and Interactive Techniques, ACM Press-Addison-Wesley Pub. Co., pp. 319-326, 2000.

Traub, "Stereoscopic Display Using Varifocal Mirror Oscillations," Applied Optics, 6(6):1085-1087, Jun. 1967.

* cited by examiner

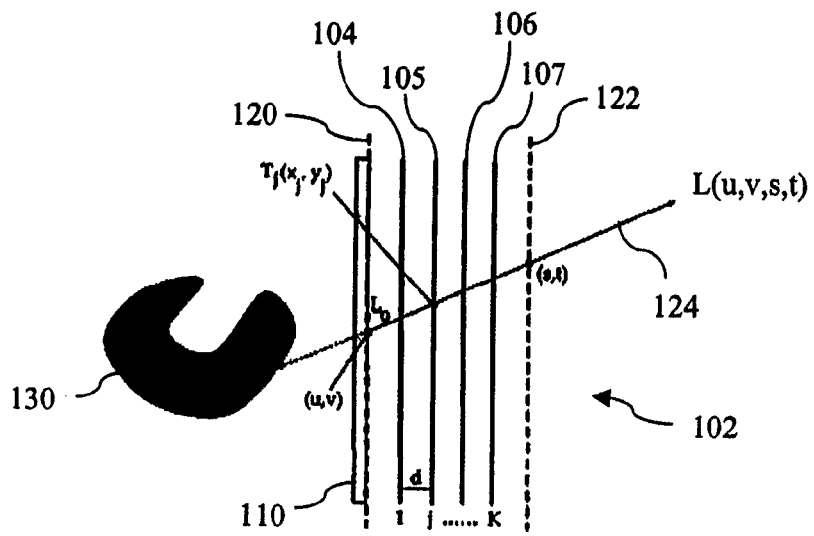
FIG. 1
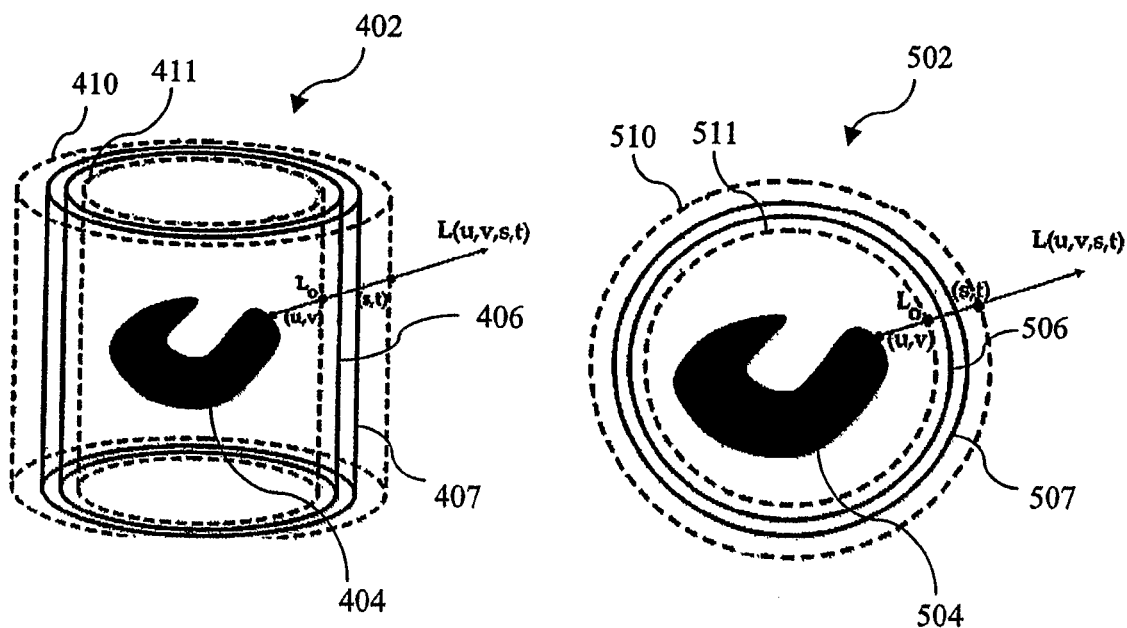
FIG. 4
FIG. 5

METHODS AND SYSTEMS FOR DISPLAYING THREE-DIMENSIONAL IMAGES

CROSS-REFERENCE TO RELATED APPLICATION

This application claims the benefit under 35 U.S.C. § 119 (e) of U.S. Provisional Patent Application No. 60/563,486, filed Apr. 19, 2004, which is hereby incorporated by reference herein in its entirety.

FIELD OF THE INVENTION

The present invention relates in general to the display of three-dimensional (3D) images of objects or scenes. More particularly, this invention relates to methods and systems for displaying 3D images by a display device or system that can control the projection of rays of light in different directions from the system.

BACKGROUND OF THE INVENTION

In the last decade, display technology has undergone a technological revolution. For example, great strides have been made in improving resolution, brightness and color characteristics of video displays, such that current display systems are able to display images with very high spatial resolution and dynamic range. In addition, because display systems have become much more affordable, they are a ubiquitous part of our everyday lives. For example, high quality television screens and projection display systems are commonly available, serving as a window to news and entertainment. Display systems have also become prevalent with regard to other types of electronic devices, enabling us to interact, for example, with personal computers, personal digital assistants (PDAs), cellular (wireless) telephones, and the like. Video display systems are also now commonly used by security personnel to monitor physical spaces, and by surgeons to view organs of their patients. More recently, high quality digital display systems have emerged as possible replacements for physical media such as photographs and paintings.

Given that we are able to perceive depth and experience the world in three dimensions, it is highly desirable to have display devices or systems that can present visual content in three dimensions. Such systems would enable us to perceive content in the most realistic manner. However, despite the recent advances in display technology, current display systems remain significantly limited with regard to the displaying of 3D images.

Because we have two eyes that each pick up a different perspective of an object being viewed, an accurate 3D display system needs to provide different appearances or images of the object or scene being displayed to the two (left and right) eyes of the observer, with each image representing a point of view from a different viewing angle. As the observer changes location with respect to the 3D display system, these left and right (stereo) views preferably continuously change. Moreover, when there are multiple simultaneous observers having different locations with respect to the display system, each observer preferably receives a different (respective) stereo view of the scene. In addition, it would be preferable for 3D display systems to be able to perform all of the above functions in real time, such that observers can be provided dynamic (time-varying) scenes in three dimensions, without compromising the resolution or quality of the 3D image being presented and without requiring the observers to wear special devices.

Given the difficulties with achieving these goals, the creation of an accurate 3D display system has for decades been considered to be a "holy grail" problem. Accordingly, it is desirable to provide methods and systems for displaying 3D images of objects or scenes that alleviate at least some of the problems commonly associated with existing 3D display systems.

SUMMARY OF THE INVENTION

Methods and systems are provided for displaying 3D images of objects or scenes. According to the principles of the present invention, 3D images are displayed using a display device or system having multiple physical layers. These physical layers are controlled (or manufactured) such that the display system produces a desired 4D light field corresponding to a real or synthetic 3D object or scene to be viewed by an observer. This is accomplished, in part, by determining the control settings (e.g., transmittance values) of one or more points in each physical layer that are required such that the desired 4D light field is produced by the display system. It is noted that the transmittance value of a point is defined herein as the ratio of the light (radiation) transmitted by the point to the total light (radiation) incident on its surface.

In one embodiment, the invention provides a method for using a plurality of physical layers in producing an output light field corresponding to a three-dimensional image, where the method includes determining a desired brightness for a first ray and a desired brightness for a second ray in the output light field, controlling the light output from each of a first point on a first physical layer, a second point on a second physical layer, and a third point on a third physical layer so that the light output from the third point on the third physical layer provides the desired brightness of the first ray, wherein the second physical layer is located between the first and third physical layers, and controlling the light output from each of a fourth point on the first physical layer, the second point on the second physical layer, and a fifth point on the third physical layer so that the light output from the fifth point on the third physical layer provides the desired brightness of the second ray, wherein the desired brightness of the first ray is provided simultaneously with the desired brightness of the second ray.

In a second embodiment, the invention provides an image display system for producing an output light field corresponding to a three-dimensional image, where the system includes a first, second, and third physical layer for simultaneously producing a first ray and a second ray in the output light field, wherein the light output from a first point on the first physical layer, a second point on the second physical layer, and a third point on the third physical layer are controlled so that the light output from the third point on the third physical layer provides a desired brightness of the first ray, and wherein the light output from a fourth point on the first physical layer, the second point on the second physical layer, and a fifth point on the third physical layer are controlled so that the light output from the fifth point on the third physical layer provides a desired brightness of the second ray, wherein the second physical layer is located between the first and third physical layers, the image display system also including a processor for use in determining the particular manner in which the light output of the first, second, third, fourth, and fifth points is to be controlled in order to produce the desired brightness of the first ray and the desired brightness of the second ray.

In a third embodiment, the invention provides an image display system for producing an output light field corresponding to a three-dimensional image, where the system includes means for determining a desired brightness for a first ray and a desired brightness for a second ray in the output light field, means for controlling the light output from each of a first point on a first physical layer, a second point on a second physical layer, and a third point on a third physical layer so that the light output from the third point on the third physical layer provides the desired brightness of the first ray, wherein the second physical layer is located between the first and third physical layers, and means for controlling the light output from each of a fourth point on the first physical layer, the second point on the second physical layer, and a fifth point on the third physical layer so that the light output from the fifth point on the third physical layer provides the desired brightness of the second ray, wherein the desired brightness of the first ray is provided simultaneously with the desired brightness of the second ray.

In a fourth embodiment, the invention provides a method for using a plurality of physical layers in producing an output light field corresponding to a three-dimensional image, where the method includes determining a desired brightness for a first ray, a desired brightness for a second ray, and a desired brightness for a third ray in the output light field, controlling the light output from each of a first point on a first physical layer and a second point on a second physical layer so that the light output from the second point on the second physical layer provides the desired brightness of the first ray, controlling the light output from each of a third point on the first physical layer and the second point on the second physical layer so that the light output from the second point on the second physical layer provides the desired brightness of the second ray, and controlling the light output from each of the first point on the first physical layer and a fourth point on the second physical layer so that the light output from the fourth point on the second physical layer provides the desired brightness of the third ray, wherein the desired brightness of the first, second, and third rays are simultaneously provided.

BRIEF DESCRIPTION OF THE DRAWINGS

Additional embodiments of the invention, its nature and various advantages, will be more apparent upon consideration of the following detailed description, taken in conjunction with the accompanying drawings, in which like reference characters refer to like parts throughout, and in which:

FIG. 1 is a simplified illustration showing a 3D display system according to at least one embodiment of the present invention;

FIG. 4 is a simplified illustration showing a cylindrical 3D display system according to at least one embodiment of the present invention; and FIG. 5 is a simplified illustration showing a spherical 3D display system according to at least one embodiment of the present invention.

DETAILED DESCRIPTION OF THE INVENTION

Figure 2:
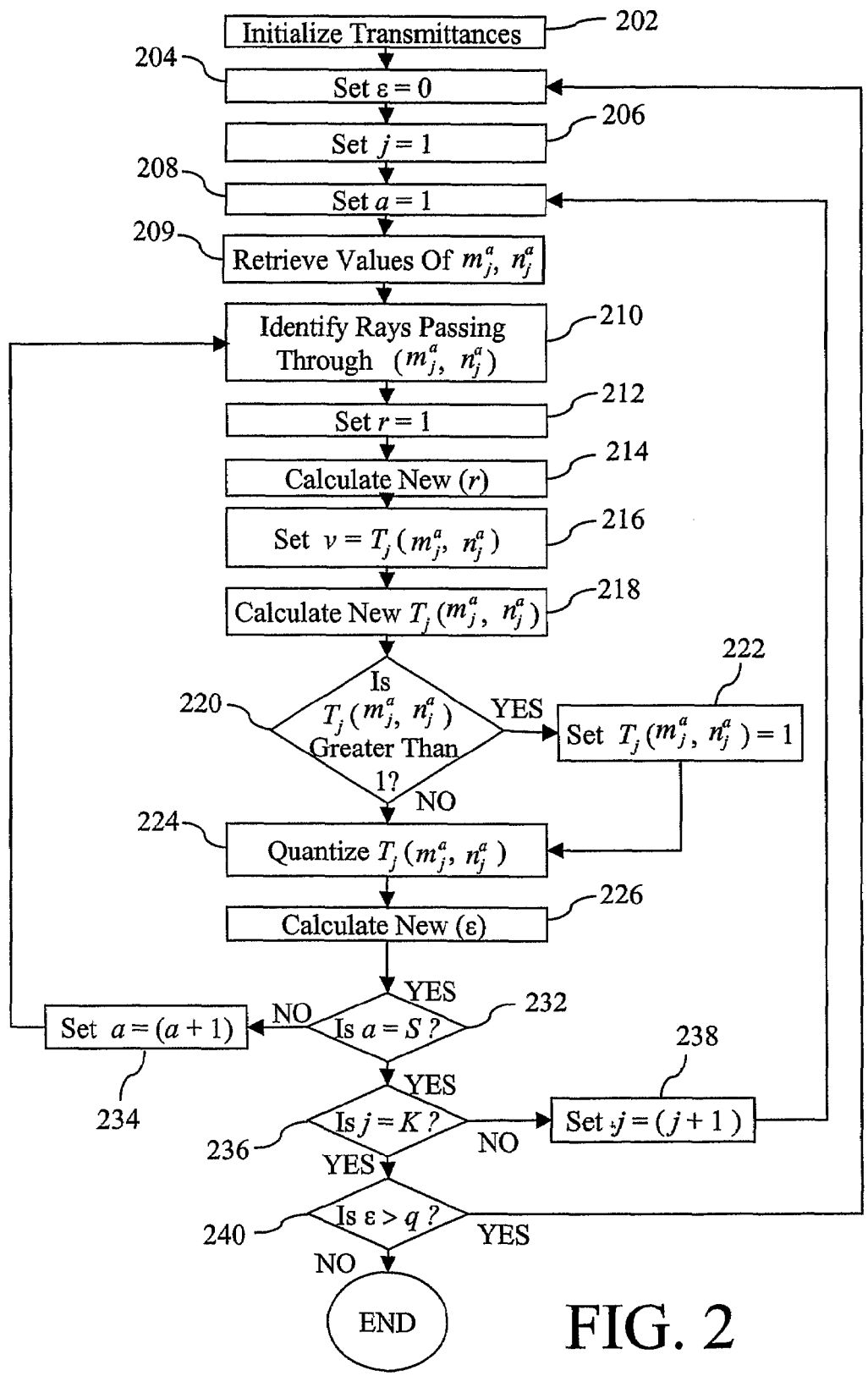
FIG. 2 is a flow chart illustrating the key steps involved in the computation of transmittance values according to at least one embodiment of the present invention.

In the following description, numerous specific details are set forth regarding preferred methods and systems of the present invention and the environment in which these and similar methods and systems may operate, etc., in order to provide a thorough understanding of the present invention. It will be apparent to one skilled in the art, however, that the present invention may be practiced without such specific details. Moreover, it will be understood that certain features which are well known in the art are not described in great detail in order to avoid complication of the subject matter of the present invention. It should also be understood that the examples provided below are merely illustrative, and that it is contemplated that there are other methods and systems that are within the scope of the present invention. For example, features in one embodiment of the invention described herein may be combined with features in one or more other embodiments described herein without departing from the scope of the present invention.

Generally speaking, the present invention is directed to methods and systems for displaying 3D images. More particularly, the present invention provides a 3D display system that is capable of outputting different colors and brightness in different directions from many or all of the physical points (elements) on the surface of the display system. Through the use of a physical and computational approach, as described below, the 3D display system is able to produce a "light field" (also called an "output light field") that represents the color and brightness leaving the display system from many or all of the physical points on the surface of the display system and in many or all directions. Such a light field is described by a four-dimensional (4D) function (also called a "4D light field"), and includes two spatial, or positional, dimensions and two directional dimensions. In various embodiments of the invention, the 3D display system has full (or at least substantial) control over the 4D light field produced by it.

FIG. 1 is a simplified illustration showing a 3D display system 102 according to at least one embodiment of the present invention. Display system 102 shown in FIG. 1 includes multiple attenuating physical layers, or transmissive layers 104-107, that are controlled in accordance with the principles of the present invention in order to produce 3D images. It will be understood that, although the use of transmissive layers to produce a 4D light field is described in detail below, the invention is not limited in this manner. For example, according to various embodiments, at least one physical layer may used that has one or more points capable of adding to the brightness value of a light ray (rather than simply attenuating the brightness value).

As shown in FIG. 1, transmissive layers 104-107 may be closely stacked (although any set of non-zero distances is possible), such that the spacing between the layers 104-107 is small but measurable. According to various other embodiments, however, there may be zero distance between at least some of layers 104-107. The invention is not limited in this manner. Moreover, for purposes of illustration, it is assumed herein that the total number of transmissive layers 104-107 (e.g., LC layers) is equal to K, that transmissive layers 104-107 are all substantially parallel to one another, and that there is a common distance d between consecutive transmissive layers 104-107. However, it is noted that the invention is not limited to these assumptions. For example, it is contemplated that, according to various embodiments, certain ones (or all) of transmissive layers 104-107 may not be parallel with respect to each other. It is also contemplated that, according to various embodiments, certain ones (or all) of transmissive layers 104-107 may not be parallel with the illumination source being used.

Each of transmissive layers 104-107 may be any suitable type of physical layers having cells or points that can control the passage of light in order to create a 2D image. For example, according to various embodiments, transmissive layers 104-107 may be controllable liquid crystal (LC) sheets or arrays that are currently used in many displays, such as conventional computer LCD monitors. However, any other suitable medium whose transmittance can be controlled can also be used. It is noted that, if a single 4D light field is to be created whose content remains static (as in the case of, e.g., advertisement billboards), dynamically controllable layers are not needed. Rather, in such cases, the transmissive layers can be made of, for example, photographic film, where each layer has a fixed transmittance function and the layers are stacked together in front of a light panel such as the one described immediately below with reference again to FIG. 1.

As shown in FIG. 1, an illumination panel 110 (also called a light box or diffuse illumination source) that produces a 4D light field (also called an "illumination light field") is placed adjacent to transmissive layer 104, and is used to illuminate transmissive layers 104-107. For example, illumination panel 110 may be similar to the type of panels used in conventional LCD computer monitors. It is noted that, because LC arrays are relatively inexpensive, the use of illumination panel 110 and multiple transmissive layers 104-107 will likely be only marginally more expensive than a conventional LC display that includes an illumination panel and a single transmissive layer.

The 4D light field being produced by display system 102 is parameterized using the two planes that are shown as dotted lines in FIG. 1 (i.e., parameterization planes 120 and 122). As shown in FIG. 1, ray of light 124 is described by its intersection (u, v) with plane 120 and intersection (s, t) with plane 122, and the brightness of ray 124 as observed outside of display system 102 is denoted as L(u, v, s, t). Although brightness is represented herein by a single number, it will be understood that, in practice, it may be vector (e.g., in the case of red, green, and blue color values). Moreover, it is noted that one or more of transmissive layers 104-107 may, in addition to controlling the brightness of rays passing through them, be used to control the color of the rays that are passed (e.g., by filtering out certain colors at one or more pixels of one or more of transmissive layers 104-107). According to various embodiments, only the final transmissive layer 107 will be used to control color, although the invention is not limited in this manner.

It is noted that the 4D light field generated by illumination panel 100 modified by transmissive layers 104-107 in order to produce the resulting 4D light field of display system 102 can be arbitrary. Nevertheless, and without loss of generality, it is assumed herein that each point on illumination panel 100 has the same radiance in all directions. Thus, the brightness of illumination panel 100 can be given by $L_o(u, v)$.

Denoting a point on the $j^{th}$ transmissive layer 105 as $(x_j, y_j)$, the transmittance of this point is denoted as $T_j(x_j, y_j)$, where $0 \leq T_j \leq 1$. Given a ray at (u, v, s, t), geometric mappings can be used to determine the intersection $(x_j, y_j)$ of the ray with the $j^{th}$ transmissive layer 105. These mappings are given by functions $P_x$ and $P_y$, where:

$$x_j = P_x(u,v,s,t,j)$$

$$y_j = P_y(u,v,s,t,j). \quad (1)$$

Considering a single ray of light (e.g., ray 124) that travels through display system 102, the ray will intersect different points of transmissive layers 104-107 (depending on its location and orientation) before it is emerged and is observable outside display system 102. In order for an observer to receive a particular brightness from this ray, the product of the transmittances of the points (cells) on the multiple transmissive layers that the ray intersects must be substantially equal to a specific value. This constraint can be written as follows:

$$L(u, v, s, t) = L_o(u, v) * \prod_{j=1}^{K} T_j(x_j, y_j), \quad (2)$$

where, once again, $0 \leq T_j \leq 1$. Therefore, the desired brightness of the ray can be achieved by a vast number of combinations of the corresponding layer transmittances. For example, with three layers, each having cells with 256 levels of transparency, each ray can have over sixteen million combinations of levels of transparency, many of which will result in the same level of brightness.

Referring back to FIG. 1, consider 3D object or scene 130 that is to be displayed using display system 102. 3D scene 130 can be a real one (i.e., one that exists somewhere in the real world), or a virtual or synthetic one (e.g., one that has been synthesized using computer graphics models). A large number of images $I_p$, p=1 ... N may be created of scene 130 so that an eye viewing display system would see these different images if the eye changes positions with respect to the display system. It is noted that although some (or all) of the image planes of images $I_p$, p=1 ... N may be parallel, this is not required. That is, according to various embodiments, the orientations of images $I_p$, p=1 ... N may be arbitrary. Moreover, for each image $I_p$, p=1 ... N, the image plane may be defined as perpendicular to the ray hitting the image center.

As described below, according to various embodiments, each of the images $I_p$, p=1 ... N may have a width of w pixels and a height of h pixels. In the case of a real scene, these images may be obtained, for example, using a single camera that moves around the scene and captures a plurality of images corresponding to different viewpoint (center of projection) locations. According to various embodiments, a plurality of synchronized cameras may be used (e.g., in connection with a dynamic scene). In the case of a synthetic scene, images corresponding to different viewpoint (center of projection) locations may be rendered, for example, using graphics rendering software. It is noted that, in both the real and synthetic cases, according to various embodiments, a large number of images $I_p$, p=1 ... N may be obtained with relatively close viewpoints in order to create a dense 4D light field. The invention is not, however, limited by the particular density of the created 4D light field using images $I_p$, p=1 ... N.

In both the real and synthetic cases, the set of images $I_p$, p=1 ... N, with each image having w×h pixels, may correspond to a large number (e.g., millions) of light rays emerging from different points and in different directions from display 102, and may be used to define the 4D light field that is produced by display system 102. Therefore, in order to accurately display 3D scene 130 by display system 102, it is desirable to find at least one solution to the computational problem relating to the transmittances $T_j(x_j, y_j)$ of all (or at least some of) the cells of all (or at least some of) the transmissive layers 104-107 that produce the desired set of light rays given the characteristics of illumination panel 110. Moreover, it will be understood that when the transmittances associated with transmissive layers 104-107 can be dynamically adjusted, new computations may be performed (and put into effect) for each new or modified 3D object or scene 130 being displayed by display system 102.

As explained in greater detail below, the system of equations associated with this computational problem may be efficiently solved given the relative simplicity of the relationship between the different unknown transmittances. It is therefore possible that the transmittance values associated with various cells of layers 104-107 can be computed in real time using, for example, one or more personal computers (PCs) with one or more processors and/or graphics cards, and suitable memory.

Additionally, when controllable transmissive layers are being used, according to various embodiments, it is possible to control the transmittances of layers 104-107 fast enough to be able to display dynamic scenes in three dimensions. Although the description herein focuses on the perception of static 3D images by an observer viewing display system 102, it is noted that the 4D light field produced by display system 102 can also be used to represent motion. For example, a video of a dynamic scene can be represented as a set of images taken as a camera moves. In this case, the time axis is replaced with one of the spatial axes, and similar to the static cases, display system 102 produces a static 4D light field. Once the transmittances of the layers 104-107 have been computed, an observer will perceive motion as he moves in relation to display system 102. Alternatively, according to various embodiments, display system 102 may be used to produce a dynamic 4D light field. In this case, an observer will perceive motion even as he remains stationary in relation to display system 102. According to yet other embodiments of the present invention, display system 102 may be used to produce a dynamic 4D light field, whereby one type of motion is perceived when an observer remains stationary in relation to display system 102, and another (different) type of motion is perceived by the observer as he moves in relation to display system 102.

It is noted that the number of possible 4D light fields is related to the number of transmissive layers 104-107 being used in display system 102. However, because the visual world has significant structure to it and redundancy within it, many real scenes can be displayed in 3D using a relatively small number of transmissive layers 104-107. Additionally, as computing power increases, so too will the number of transmissive layers for which transmittance values can be computed in real time.

In accordance with the principles of the present invention, the transmittance values may be computed by minimizing an error measurement between the set of desired images $I_p$, p=1 . . . N and the images produced by display system 102. Because the desired images $I_p$, p=1 . . . N are given as inputs to an algorithm, they are referred to below as input images. It is noted that the capture parameters of each of the input images is assumed to be known, such that each pixel in the input images can be associated with a 3D ray. If the capture parameters are unknown, according to various embodiments, these parameters may be estimated from the images. Techniques for estimating these parameters are known in the art, and are described, for example, in "Multiple View Geometry," by R. Hartley and A. Zisserman, Cambridge University Press, which is hereby incorporated by reference herein in its entirety.

In order to keep the processing to a manageable level, the transmittance values for a discrete set of locations in each transmissive layer are computed. The discrete set of locations on transmissive layer j is denoted by $(m_j^1, n_j^1), \ldots, (m_j^S, n_j^S)$, where the common superscript of $m_j$ and $n_j$ is used to index the different locations. Thus, it is noted that the discrete set of locations denoted by $(m_j^1, n_j^1), \ldots, (m_j^S, n_j^S)$ need not be on a square or even rectangular grid, but rather, may collectively define any suitable shape. As an example, in the case of a three-by-four grid, the twelve discrete locations would be referenced by varying the superscript of $m_j$ and $n_j$ between the index values of one and twelve.

The selection of the discrete set of locations in the transmissive layers depends on the properties of the transmissive layers. For example, in the case of LC layers, it is sufficient to solve for the transmittance values of each pixel on the LC sheets. Therefore the discrete set of locations $(m_j^1, n_j^1), \ldots, (m_j^S, n_j^S)$ on transmissive layer j is selected to be the centers of the pixels of the $j^{th}$ LC sheet. If continuous transmissive layers are used, such as photographic film, then the set of discrete locations can be set to be the nodes of a dense grid. It will be understood that the phrase "grid nodes" is used herein to refer to the discrete set of locations in a transmissive layer, with the understanding that these locations are not necessarily constrained to be on a grid, but rather may be any suitable discrete points.

FIG. 2 is a flow chart illustrating the key steps involved in the computation of transmittance values of grid nodes according to various embodiments of the present invention. It will appreciated by persons versed in the art that various steps described below in connection with the flow chart of FIG. 2 are based on the projection onto convex sets (POCS) method. However, alternate methods are contemplated, and the invention is not limited in this manner.

As shown in FIG. 2, in step 202, the transmittance value of each grid node in each transmissive layer is initialized. This initialization can be arbitrary. For example, all transmittance values can be set to a value of one. In this case, $\forall j, a, T_j(m_j^a, n_j^a)=1$. A different initialization can be used, for example, when the displayed scene is dynamic (e.g., a movie clip). In this case, the algorithm described in connection with the flow chart of FIG. 2 will likely be applied multiple times in order to compute the transmittance values for each new frame (time instance) of the dynamic scene. When this is the case, a more efficient initialization in step 202 may involve using the same (or substantially the same) transmittance values that were computed for the preceding frame as the initial transmittance values when computing the new frame's transmittance values.

In step 204, a variable $\epsilon$ is initialized (set) to zero (i.e., $\epsilon \leftarrow 0$). As described further below, the algorithm represented by the flow chart of FIG. 2 is iterative, and in each iteration, the algorithm updates the transmittance value of each grid node in each transmissive layer. Moreover, this algorithm may be assumed to have converged when an iteration does not change the transmittance values in a substantial manner, as measured, for example, by the variable $\epsilon$, which accumulates a measure of the changes in the transmittance values in each iteration. For example, as described below, if the value of $\epsilon$ is smaller than a pre-defined threshold at the end of an iteration, the algorithm may be assumed to have converged and thus the iterative process is complete.

As shown in FIG. 2, the iterative process mentioned above may include an external loop over the layers j=1 . . . K and an internal loop over each of the grid nodes $(m_j^a, n_j^a)$ for each transmissive layer j. Thus, according to various embodiments, steps 210-226 shown in FIG. 2 may be applied sequentially to all grid nodes $(m_j^1, n_j^1), \ldots, (n_j^S, n_j^S)$ in each of layers 1 through K, each time to a different node $(m_j^a, n_j^a)$.

In steps 206 and 208, respectively, variable j may be set to one (corresponding to the initial transmittance layer), and variable a may be set to one (corresponding to an index value of one). In step 209, the values (coordinates) of $m_j^a$ and $n_j^b$ are retrieved. For example, when a is set to one, $(m_j^a, n_j^a)$ will refer to the first grid node in transmissive layer j to be considered. Next, in step 210, a list of rays $G(m_j^a, n_j^a, j)$ may be associated with grid node $(m_j^a, n_j^a)$ in transmissive layer j, where the length of the list is denoted as M. This list can be computed in the following manner.

Figure 3:
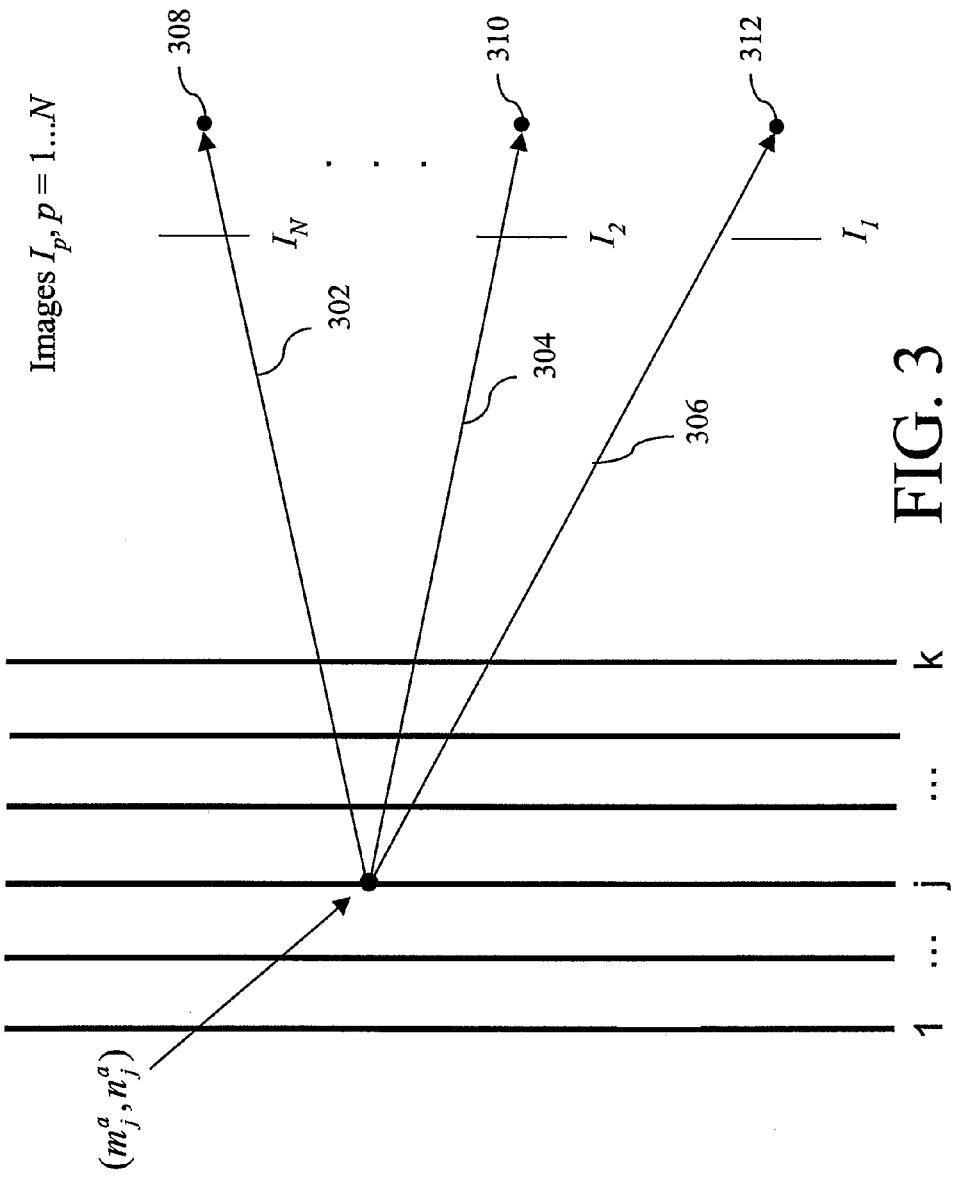
FIG. 3 is a simplified illustration showing an example of three rays projecting through a point in transmissive layer j to three respective viewpoints according to at least one embodiment of the present invention.

For each input image $I_p$, the ray that projects the point $(m_j^a, n_j^a)$ in transmissive layer j to the viewpoint (center of projection) of image $I_p$ is computed. This ray is associated with a 2D point (x, y) in the coordinate system of image $I_p$. Assuming that the pixels in image $I_p$ are associated with coordinates (1 ... w, 1 ... h), the ray is added to the list $G(m_j^a, n_j^a, j)$ only if point (x, y) falls within the pixels of $I_p$ (i.e., only if $1 \leq x \leq w$ and $1 \leq y \leq h$). If point (x, y) falls within the pixels of $I_p$, the ray coordinates (u, v, s, t) are computed by the intersections (u, v), (s, t) of the ray with the parameterization planes (e.g., planes 120 and 122 described above in connection with FIG. 1), and the ray is added to the list $G(m_j^a, n_j^a, j)$. Thus, $G(m_j^a, n_j^a, j)$ represents the list of all rays passing through point $(m_j^a, n_j^a)$ in layer j and measured in one of the input images $I_p$, k=1 ... N. FIG. 3 is a simplified illustration showing an example of three rays 302, 304, and 306 that project through point $(m_j^a, n_j^a)$ in layer j to viewpoints 308, 310, and 312, respectively. In the example shown in FIG. 3, ray 302 will be added to the list $G(m_j^a, n_j^a, j)$ because its associated point (x, y) in the coordinate system of image $I_N$ falls within the pixels of image $I_N$. Similarly, ray 304 will be added to the list $G(m_j^a, n_j^a, j)$. Ray 306, on the other hand, will not be added to the list $G(m_j^a, n_j^a, j)$ because its associated point (x, y) in the coordinate system of image $I_1$ does not fall within the pixels of image $I_N$ (as shown in FIG. 3). It should be noted that, although viewpoints 308, 310, and 312 are shown as being located behind their respective images, the invention is not limited in this manner.

For each ray added to the list $G(m_j^a, n_j^a, j)$, the brightness of the ray L(u, v, s, t) is set to be the brightness of point (x, y) in image $I_p$. When (x, y) are non-integer, the image brightness at location (x, y) is evaluated by interpolating the image intensities at neighboring pixels (e.g., using bicubic or bilinear interpolation).

It is noted that finding list $G(m_j^a, n_j^a, j)$ can be computationally intensive. Thus, according to various embodiments of the invention, at least some of the lists may be computed off-line and stored in memory in order to accelerate the computation. However, storing the lists off-line may require the use of large volumes of memory, and thus, off-line computation may raise a tradeoff between the amount of memory used and the number of computations that are required per iteration. The decision regarding whether to compute the lists off-line can be based, for example, on the available memory and computational resources. It will be understood that the invention is not limited to the use (or the lack of use) of off-line computation.

Once the list of rays $G(m_j^a, n_j^a, j)$ has been computed for grid node $(m_j^a, n_j^a)$ in transmissive layer j as described above, in step 212, a new variable r is set to one. Next, in step 214, a new value of r is calculated as r multiplied by the product of the ratios of the brightness values L(u, v, s, t) of the measured rays in $G(m_j^a, n_j^a, j)$ and the brightness values produced by the display, which according to equation 2, is given by:

$$L_o(u, v) * \prod_{j=1}^{K} T_j(P_x(u, v, s, t, j), P_y(u, v, s, t, j)),$$

where, as explained above, K is the number of transmissive layers, and $P_x(u, v, s, t, j)$, $P_y(u, v, s, t, j)$ are as defined in equation 1. That is, for each ray (u, v, s, t) in the list $G(m_j^a, n_j^a, j)$, the new value of r is set to r multiplied by:

$$\left\{ L(u, v, s, t) / \left[ L_o(u, v) * \prod_{j=1}^{K} T_j(P_x(u, v, s, t, j), P_y(u, v, s, t, j)) \right] \right\}.$$

It should be noted that this formula for calculating the new value of r is based on transmittance values in arbitrary locations ($P_x(u, v, s, t, j), P_y(u, v, s, t, j)$), whereas the transmittance values were defined so far only for the discrete set of grid nodes $(m_j^1, n_j^1), \ldots, (m_j^S, n_j^S)$. In order to evaluate the transmittance values in arbitrary locations in each layer, according to various embodiments, the transmittance values at adjacent grid nodes may be interpolated. It will be understood that the interpolation technique that may be used can change from one display system to another, or from one application to another of the same display system. For example, when pixelized transmissive layers are used, such as LC sheets, a nearest-neighbor interpolation technique can be used, where a transmittance value at an arbitrary location may be set to be the transmittance value of the closest grid node. Additionally, for example, when continuous transmissive layers are used, such as photographic film, a smooth interpolation technique such as bilinear interpolation can be used.

Referring back to the flow chart of FIG. 2, in step 216, a new variable v is set to the transmittance value $T_j(m_j^a, n_j^a)$. Next, in step 218, transmittance value $T_j(m_j^a, n_j^a)$ of the grid node is multiplied by the $M^{th}$ root of r (i.e., $T_j(m_j^a, n_j^a) = (r^{1/M}) * T_j(m_j^a, n_j^a)$), where again, M is the length of the list $G(m_j^a, n_j^a, j)$. Because a transmittance value $T_j(m_j^a, n_j^a)$ by definition cannot be larger than one, in step 220, it is determined whether the value of $T_j(m_j^a, n_j^a)$ resulting from step 218 is larger than one. If it is, $T_j(m_j^a, n_j^a)$ is set to one in step 222, and the algorithm then proceeds to optional step 224 described below. Otherwise, the algorithm proceeds directly from step 220 to optional step 224.

In some transmissive materials, the transmittance values are bounded to a discrete set of values. This is the case, for example, with LC sheets that are electronically controlled to the accuracy of a finite number of bits. When such transmissive layers are used, according to various embodiments of the present invention, optional step 224 may be used. In step 224, the updated value of $T_j(m_j^a, n_j^a)$ resulting from step 218 is quantized to become the closest value that is achievable by the transmissive layers.

Next, in step 226, $\epsilon$ is updated by adding to it the absolute value of the log of the ratio between the value of $T_j(m_j^a, n_j^a)$ before and after it is updated in step 218. That is, in step 226, $\epsilon = \epsilon + abs[\log(v/T_j(m_j^a, n_j^a))]$.

In step 232, it is determined whether the value of a (which is originally set to one in step 208) is equal to the value of S. If it is not, in step 234, the value of a is incremented by one, and the process returns to step 210. According to various embodiments, steps 210-226 will repeat until the value of a is found to be equal to the value of S in step 232, at which point the process proceeds to step 236. In this manner, steps 210-226 are carried out for all grid nodes $(m_j^1, n_j^1), \ldots, (m_j^S, n_j^S)$ on transmissive layer j (which, in the initial iteration, is set to one). According to various other embodiments, the execution of steps 210-226 may end before the value of a is found to be equal to the value of S (e.g., upon the occurrence of a predetermined termination event).

In step 236, it is determined whether the value of j is equal to the value of K, which, as explained above, represents the total number of transmissive layers being used. If it does not, the value of j is incremented by one in step 238, and the process returns to step 208. However, if it is determined in step 236 that the value of j is equal to the value of K, then the process proceeds to step 240.

The purpose of step 240 is to determine whether a convergence criterion has been met in the algorithm. For example, according to various embodiments, in step 240, $\epsilon$ may be compared to a predefined threshold value q. If $\epsilon$ is determined to be greater than q in step 240, then the process returns to step 204. According to various embodiments, the value of threshold value q may be found experimentally, depending on the available computational resources and the required accuracy. Other methods of determining convergence are also contemplated. Additionally, for example, according to various embodiments, the algorithm can be stopped following a predetermined number of iterations, regardless of the value of $\epsilon$. In this case, step 240 would be used to determine whether the algorithm should end before the predetermined number of iterations have been completed.

The algorithm that was described above with reference to the flow chart of FIG. 2 may be used to compute a set of transmittances and illumination intensities that meet all the constraints in equation 2. However, with some display systems, it may not be possible to produce the desired 4D light field with the desired accuracy, for example when the number of transmissive sheets or layers is too small for a given scene to be displayed. In such cases, it is desirable to minimize the discrepancy between the produced light field and the input images $I_p$, p=1 ... N. The level of tolerance may depend on the specific requirements of the display. For example, it may be preferable to emphasize the light field accuracy for certain viewing regions, allowing larger error in other regions. Another option is to emphasize the localization of visual discontinuities, allowing the produced brightness values to be modestly different than the input brightness values. When presenting dynamic scenes, emphasis may be placed on maintaining a temporally coherent light field. Moreover, according to various embodiments, the visual acuity of the observer in space and time may also be used, and the discrepancy measure may be influenced only by differences that are noticeable by the observer.

It is desirable to be able to handle these practical issues as well as other constraints and preferences that may arise in specific implementations of a display system according to the invention. For this purpose, another approach is provided in accordance with the invention to compute the transmittance values of the layers. In general, this approach described immediately below may allow for more flexibility in obtaining the appropriate visual results than the prior formulation described above in connection with the flow chart of FIG. 2. For example, this approach allows the flexibility of adding relevant constraints, while using generic optimization tools.

Taking the logarithm of equation 2 leads to:

$$\log(L(u, v, s, t)) - \log(L_o(u, v)) = \sum_{j=1}^{K} \log(T_j(x_j, y_j)), \quad (3)$$

subject to the constraint that $\forall j, x_j, y_j, \log(T_j(x_j, y_j)) \leq 0$. The set of unknown values $\log(T_j(x_j, y_j))$ on the right hand side of equation 3 can be ordered as a vector $\vec{x}$. Similarly, the set of known values on the left hand side of equation 3 can be ordered as a vector $\vec{y}$. The linear relations in equation 3 can then be described using a sparse matrix A, such that: $A\vec{x} = \vec{y}$, subject to the constraint that all entries of the vector $\vec{x}$ are smaller than or equal to zero.

The optimization problem in this case is to find the vector $\vec{x}$ that minimizes the discrepancy between $A\vec{x}$ and $\vec{y}$. For example, it can minimize the sum of squared differences $\|A\vec{x} - \vec{y}\|^2$. As another example, it can minimize a more sophisticated discrepancy, $\|B(A\vec{x} - \vec{y})\|2 + \|C\vec{x}\|^2$, where B, and C are linear operators. For example, B can model the weighted sum of squared differences of the desired images $I_p$ from the produced ones:

$$\sum_{(u,v,s,t)} o(u, v, s, t) \left[ \log(L(u, v, s, t)) - \log(L_o(u, v)) - \sum_{j=1}^{K} \log(T_j(x_j, y_j)) \right]^2.$$

The weights $o(u, v, s, t)$ can be set up in many ways in order to bias the result towards a desirable visual appearance. For example, C can impose (weighted) spatial-temporal smoothness constraints. It is noted that none of these large (sparse) matrices A, B, or C need necessarily to be constructed explicitly. Rather, standard optimizers such as projections onto convex sets, described in "Superresolution Video Reconstruction With Arbitrary Sampling Lattices and Nonzero Aperture Time," by A. J. Patti et al., which is hereby incorporated by reference herein in its entirety, and gradient methods can be implemented without constructing the matrices, using computations similar to the ones in the algorithm described above in connection with flow chart of FIG. 2.

It will be appreciated by persons versed in the art that the cost function and optimization technique can change from one display to another, as they depend, for example, on the properties of the viewed scene (e.g., static or dynamic), the properties of the display (e.g., the number and type of the transmissive layers), and the available computational resources. For a static scene that is displayed using photographic film, according to various embodiments, a computationally intensive optimization may be used in order to accurately recover the transmittance values of a large number of grid nodes in each transmissive layers. On the other hand, for example, in the case of a dynamic scene displayed by LC sheets, according to various embodiments, a fast optimization technique with possibly coarser quality can be chosen. Thus, the technique described immediately above serves as a framework, where the cost function and the optimization technique can be matched to the specific properties of the display and the displayed scene.

Although the invention has been described and illustrated in the foregoing illustrative embodiments, it is understood that the present disclosure has been made only by way of example, and that numerous changes in the details of implementation of the invention can be made without departing from the spirit and scope of the invention. For example, although four sheets of transmissive layers 104-107 is shown in FIG. 1, the invention is not limited in this manner. Rather, according to various embodiments of the present invention, for example, two to ten sheets (or more) of transmissive layers can be used to produce a desired 4D light field with a high resolution in accordance with the principles of the present invention. Thus, persons versed in the art will appreciate that the invention is not limited by the number of transmissive layers being used. Similarly, the invention is not limited by the particular type (e.g., LC) of transmissive layers being used.

Moreover, it will be understood that, although the invention is described with particular attention to display systems using flat transmissive layers (e.g., display system 102, which uses flat transmissive layers 104-107), the invention is not limited in this manner. For example, as shown in FIGS. 4-5, the approaches described above can be applied to curved display systems. FIG. 4 shows a cylindrical 3D display system 402 according to at least one embodiment of the present invention. As shown, display system 402 may be used for displaying real or virtual scene 404, and includes a plurality of transitive layers 406-407 (e.g., curved LC layers) placed over an illumination source (not shown), and parameterization planes 410-411. FIG. 5, on the other hand, shows a spherical 3D display system 502 according to at least one embodiment of the present invention. As shown, display system 502 may be used for displaying real or synthetic scene 404, and includes a plurality of transitive layers 506-507 (e.g., curved LC layers) placed over an illumination source (not shown), and parameterization planes 410-411. In both cases, a 4D light field is parameterized using (u, v) and (s, t) in the manner described above. In particular, in the cylindrical case shown in FIG. 4, (u, v) and (s, t) can each be cylindrical coordinates (angle and height), and in the spherical case shown in FIG. 5, they can each be spherical angles (azimuth and polar).

Curved 3D display systems such as the ones shown in FIGS. 4-5 may be very useful in certain situations. For example, a spherical 3D display system (such as device 502 shown in FIG. 5) would allow an observer to walk around the display system and view an object scene in three dimensions from all angles, providing significant benefits in various fields such as medical imaging, architecture, product design, and military applications.

Other embodiments, extensions, and modifications of the ideas presented above are comprehended and should be within the reach of one versed in the art upon reviewing the present disclosure. For example, as mentioned above, it is contemplated that one or more physical layers may be used in a 3D display system according to the invention that have one or more points capable of adding to the brightness value of a light ray. That is, one or more points on one or more physical layers may be capable and configured to provide a positive contribution to the brightness value associated with a light ray, rather than simply attenuating the brightness value. In this manner, light rays passing through (and being modified by) a physical layer, such as a plasma display layer, may also experience an increase in their brightness value. Moreover, according to various embodiments in which one or more points are capable of providing an increase in (or the introduction of) brightness, a separate light source such as illumination panel 110 described above may not be present. It will be understood that, when at least one point on one of the physical layers being used is capable of increasing brightness, the algorithm described above for computing transmissive values may be extended such that the desired increase in brightness value of rays at one or more points on one or more layers may be computed.

Accordingly, the scope of the present invention in its various aspects should not be limited by the examples presented above. The individual aspects of the present invention, and the entirety of the invention should be regarded so as to allow for such design modifications and future developments within the scope of the present disclosure. The present invention is limited only by the claims which follow.

What is claimed is:

1. A method for using a plurality of physical liquid crystal layers in producing an output light field corresponding to a three-dimensional image, the method comprising:
   determining a desired brightness for a first ray and a desired brightness for a second ray in the output light field;
   controlling the light output from each of a first point on a first physical liquid crystal layer, a second point on a second physical liquid crystal layer, and a third point on a third physical liquid crystal layer so that the light output from the third point on the third physical liquid crystal layer provides the desired brightness of the first ray, wherein the second physical liquid crystal layer is located between the first and third physical liquid crystal layers; and
   controlling the light output from each of a fourth point on the first physical liquid crystal layer, the second point on the second physical liquid crystal layer, and a fifth point on the third physical liquid crystal layer so that the light output from the fifth point on the third physical liquid crystal layer provides the desired brightness of the second ray, wherein the desired brightness of the first ray is provided simultaneously with the desired brightness of the second ray.

2. The method of claim 1, further comprising:
   determining a desired brightness for a third ray in the output light field; and
   controlling the light output from each of a sixth point on the first physical liquid crystal layer, a seventh point on the second physical liquid crystal layer, and the third point on the third physical liquid crystal layer so that the light output from the third point on the third physical liquid crystal layer provides the desired brightness of the third ray, wherein the desired brightness of the third ray is provided simultaneously with the desired brightness of the first and second rays.

3. The method of claim 1, wherein the first and second rays originate from an illumination panel located before the first physical liquid crystal layer.

4. The method of claim 3, wherein each point on the illumination panel has substantially the same radiance.

5. The method of claim 1, wherein the plurality of physical liquid crystal layers are stacked with a substantially common zero or non-zero distance between adjacent physical liquid crystal layers.

6. The method of claim 1, wherein the plurality of physical liquid crystal layers are substantially parallel to one another.

7. The method of claim 1, wherein the three-dimensional image corresponds to a real object or scene, the method further comprising capturing a plurality of images of the real object or scene that are used in defining the output light field.

8. The method of claim 1, wherein the three-dimensional image corresponds to a synthetic object or scene, the method further comprising creating a plurality of images of the synthetic object or scene using graphics rendering software that are used in defining the output light field.

9. The method of claim 1, wherein at least one of the first, second, and third points provides a positive contribution to the brightness associated with the first ray.

10. The method of claim 1, wherein at least one of the second, fourth, and fifth points provides a positive contribution to the brightness associated with the second ray.

11. The method of claim 1, wherein the first, second, and third physical liquid crystal layers are transmissive layers, and wherein the controlling the light output from each of the first, second, third, fourth, and fifth points comprises:
computing transmittance values for each of the first, second, third, fourth, and fifth points; and
configuring each of the first, second, third, fourth, and fifth points according to the respective computed transmittance values.

12. The method of claim 11, wherein the transmittance values for the first, second, third, fourth, and fifth points on each of the plurality of transmissive layers are dynamically adjustable.

13. The method of claim 11, further comprising:
computing new transmittance values for at least one of the first, second, third, fourth, and fifth points in connection with a new three-dimensional image to be produced;
configuring at least one of the first, second, third, fourth, and fifth points according to the respective new computed transmittance values.

14. The method of claim 11, wherein the computing transmittance values for each of the first, second, third, fourth, and fifth points comprises:
assigning a respective initial transmittance value to each of the first, second, third, fourth, and fifth points;
determining the resulting brightness of the first and second rays that would result given the assigned initial transmittance values;
comparing the resulting brightness of the first ray to the desired brightness of the first ray and comparing the resulting brightness of the second ray to the desired brightness of the second ray; and
modifying the initial transmittance values based on the comparison of the resulting brightness of the first and second rays to the desired brightness of the first and second rays.

15. The method of claim 14, further comprising repeatedly performing the determining step, the comparing step, and the modifying step until the resulting brightness of the first ray is within a first tolerance of the desired brightness of the first ray and the resulting brightness of the second ray is within a second tolerance of the desired brightness of the second ray.

16. The method of claim 15, wherein the first tolerance is substantially the same as the second tolerance.

17. The method of claim 11, wherein the computing transmittance values for each of the first, second, third, fourth, and fifth points comprises:
assigning initial transmittance values to each of the first, second, third, fourth, and fifth points;
associating a plurality of rays, including at least one of the first and second rays, with each of the first, second, third, fourth, and fifth points, wherein each of the associated light rays in used in defining the output light field;
for each of the first, second, third, fourth, and fifth points, calculating the ratio, for each associated ray, of a desired brightness of the ray in the output light field to the brightness of the ray resulting from the use of the plurality of physical liquid crystal layers; and
computing a new transmittance value for at least one of the first, second, third, fourth, and fifth points based at least in part on the calculated ratios and previous values of the ratios.

18. An image display system for producing an output light field corresponding to a three-dimensional image, the system comprising:
a first, second, and third physical liquid crystal layer for simultaneously producing a first ray and a second ray in the output light field, wherein the light output from a first point on the first physical liquid crystal layer, a second point on the second physical liquid crystal layer, and a third point on the third physical liquid crystal layer are controlled so that the light output from the third point on the third physical liquid crystal layer provides a desired brightness of the first ray, and wherein the light output from a fourth point on the first physical liquid crystal layer, the second point on the second physical liquid crystal layer, and a fifth point on the third physical liquid crystal layer are controlled so that the light output from the fifth point on the third physical liquid crystal layer provides a desired brightness of the second ray, wherein the second physical liquid crystal layer is located between the first and third physical liquid crystal layers; and
a processor for use in determining the particular manner in which the light output of the first, second, third, fourth, and fifth points is to be controlled in order to produce the desired brightness of the first ray and the desired brightness of the second ray.

19. The system of claim 18, wherein the first, second, and third physical liquid crystal layers produce a third ray in the output light field simultaneously with the first and second rays, wherein the light output from a sixth point on the first physical liquid crystal layer, a seventh point on the second physical liquid crystal layer, and the third point on the third physical liquid crystal layer are controlled so that the light output from the third point on the third physical liquid crystal layer provides a desired brightness of the third ray.

20. The system of claim 18, further comprising an illumination panel from which the first and second rays originate.

21. The system of claim 18, wherein each of the physical liquid crystal layers is substantially flat.

22. The system of claim 18, wherein each of the physical liquid crystal layers is substantially cylindrical in shape.

23. The system of claim 18, wherein each of the physical liquid crystal layers is substantially spherical in shape.

24. The system of claim 18, wherein the physical liquid crystal layers are substantially parallel to one another.

25. The system of claim 18, wherein the physical liquid crystal layers are separated from one another by a substantially common zero or non-zero distance.

26. The method of claim 18, wherein at least one of the first, second, and third points provides a positive contribution to the brightness associated with the first ray.

27. The method of claim 18, wherein at least one of the second, fourth, and fifth points provides a positive contribution to the brightness associated with the second ray.

28. The system of claim 18, wherein the first, second, and third physical liquid crystal layers are transmissive layers, and wherein each of the first, second, third, fourth, and fifth points has an associated transmittance value.

29. An image display system for producing an output light field corresponding to a three-dimensional image, the system comprising:
means for determining a desired brightness for a first ray and a desired brightness for a second ray in the output light field;
means for controlling the light output from each of a first point on a first physical liquid crystal layer, a second point on a second physical liquid crystal layer, and a third point on a third physical liquid crystal layer so that the light output from the third point on the third physical liquid crystal layer provides the desired brightness of the first ray, wherein the second physical liquid crystal layer is located between the first and third physical liquid crystal layers; and means for controlling the light output from each of a fourth point on the first physical liquid crystal layer, the second point on the second physical liquid crystal layer, and a fifth point on the third physical liquid crystal layer so that the light output from the fifth point on the third physical liquid crystal layer provides the desired brightness of the second ray, wherein the desired brightness of the first ray is provided simultaneously with the desired brightness of the second ray.

30. A method for using a plurality of physical liquid crystal layers in producing an output light field corresponding to a three-dimensional image, the method comprising:
- determining a desired brightness for a first ray, a desired brightness for a second ray, and a desired brightness for a third ray in the output light field;
- controlling the light output from each of a first point on a first physical liquid crystal layer and a second point on a second physical liquid crystal layer so that the light output from the second point on the second physical liquid crystal layer provides the desired brightness of the first ray;
- controlling the light output from each of a third point on the first physical liquid crystal layer and the second point on the second physical liquid crystal layer so that the light output from the second point on the second physical liquid crystal layer provides the desired brightness of the second ray; and
- controlling the light output from each of the first point on the first physical liquid crystal layer and a fourth point on the second physical liquid crystal layer so that the light output from the fourth point on the second physical liquid crystal layer provides the desired brightness of the third ray, wherein the desired brightness of the first, second, and third rays are simultaneously provided.

* * * * *